United States Patent Office 3,294,750
Patented Dec. 27, 1966

3,294,750
CATALYTIC POLYMERIZATION OF TRIOXANE
Mario Baccaredda, Enzo Butta, and Paolo Giusti, Pisa, Italy, assignors to Continental Oil Company, Ponca City, Okla., a corporation of Delaware
No Drawing. Filed Feb. 25, 1963, Ser. No. 260,902
20 Claims. (Cl. 260—67)

This invention relates to an improved method for producing exceptionally high yields of high molecular weight polyoxymethylene polymers having an unusually high degree of crystallinity and directly in the form of fibers. More particularly, but not by way of limitation, the present invention relates to a method of polymerizing trioxane using a solid, liquid or gaseous phase catalyst material and commencing with a solution of the trioxane monomer in a nonaqueous solvent.

It is well known that trioxane may be polymerized in the presence of small amounts of certain catalytic materials to produce a tough, high molecular weight polymer, known as polyoxymethylene, which is useful in the production of molded or extruded articles. A number of improved procedures for accomplishing such polymerization have been recently developed, and several of these are described in United States Patents 2,989,505 through 2,989,511, inclusive, all assigned to the Celanese Corporation of America.

In United States Patent 2,989,505 issued to Donald E. Hudgin and Frank M. Berardinelli, a process is described in which trioxane suspended in a nonsolvent therefor is polymerized by contacting the trioxane suspension with a suitable catalyst while maintaining the temperature of the suspension between 64° C. and 75° C. and stirring the suspension vigorously. The yields which are obtained by the described method are between 50 and 60 percent.

The polymerization process described in United States Patent 2,989,506 issued to Hudgin and Berardinelli provides for the polymerization of molten trioxane at atmospheric pressure and a temperature of between −10° C. and 180° C. The pure molten trioxane is polymerized by direct contact with a catalytic amount of a trioxane-polymerization catalyst, preferably a boron fluoride coordinate complex with an organic compound.

In the process described in United States Patent 2,989,508, also issued to Hudgin and Berardinelli, polymerization of the trioxane is accomplished in a liquid solution. The solution is stirred during polymerization and the polymer precipitates out of solution as it is formed. Polymerization by this method requires a number of hours to complete and yields of from 20 to 90 percent are obtained.

In United States Patent 2,989,510, issued to George J. Bruni, the polymerization of trioxane to form a high molecular weight polymer is accomplished by dissolving the trioxane in an inert, nonaqueous solvent, introducing a trioxane-polymerization catalyst to the solvent at an initial temperature of between 10° and 110° C., keeping the reaction mixture for a certain length of time at the initial temperature for initiating polymerization and, then carrying on the reaction at a lower (constant) temperature, after having cooled the mixture in a very rapid way (quenching). Polymerization is accomplished in suspension at constant temperature. The process contemplates the employment of a solvent having substantially greater solubility for trioxane at higher temperatures than at lower temperatures, and which has very little change in precipitation temperature with substantial changes in trioxane concentration. As the temperature of the solution is brought down from the initial to the polymerization temperature, the trioxane precipitates out of solution and the precipitated monomer is polymerized at a final fixed temperature. As an alternative to reducing the temperature of the trioxane solution to produce precipitation of the monomer, the continuation of polymerization following the initiation thereof at the initial high temperature may be carried out without precipitation, provided that it is carried out at a temperature just above the precipitation temperature. In the latter event, the polymerization initiation and continuation may both be carried out in the same narrow temperature range.

In the Bruni process, the suspended phase polymerization following initiation at the high initial temperature is carried out at a temperature of between about −10° C. and about 60° C. with from 0° C. to about 55° C. being preferred. Reduction of the temperature in the previously described patent is carried out very rapidly (quenching) and the patentee indicates that it is important that polymerization be initiated in solution prior to decreasing the temperature to precipitate the monomer and continue the polymerization of the trioxane in the suspended phase.

The present invention, which is an improvement over the processes described in the prior art, provides a substantial increase in the yield of the polyoxymethylene polymer obtained, and also in the degree of crystallinity of such polymer, which is obtained directly in form of fibers.

It is a major object of the invention to provide an improved process for polymerizing trioxane to produce a polyoxymethylene polymer having improved properties.

A more specific object of the present invention is to provide a process for polymerizing trioxane to produce polyoxymethylene in better yields than has heretofore been possible by previously known processes.

An additional object of the present invention is to provide an improvement in heretofore known processes for polymerizing trioxane starting with a solution of trioxane in a suitable inert, nonaqueous solvent, and contacting the trioxane solution with an ionic, trioxane-polymerization catalyst.

An additional object of the present invention is to provide a commercially feasible method of producing large quantities of polyoxymethylene having a high degree of crystallinity in form of fibers having high thermal stability and improved physical and mechanical properties.

Additional objects and advantages of the invention will become apparent from a reading of the following detailed description of the invention and the examples of its practice which are set forth hereinafter.

In its broad aspect, the present invention comprises a process for preparing solid high molecular weight polyoxymethylene of high crystallinity by contacting an ionic trioxane polymerization catalyst with a solution of trioxane in a viscous, nonaqueous solvent at an initial temperature of at least the melting point of trioxane maintaining the solution at at least the melting point of trioxane until polymerization is initiated and thereafter gradually decreasing the temperature of the solution below the melting point of trioxane at a controlled rate of decrease of from about 4° C. per hour to about 50° C. per hour.

In one aspect of the invention, a small amount of molten trioxane is present in the solution prior to decreasing the solution temperature to below the melting point of trioxane. The undissolved molten trioxane can be provided in a number of ways. For example, in the preferred embodiment of the invention, sufficient trioxane is provided in the reaction mixture to essentially saturate the solution and, in addition, furnish a small excess of trioxane to assure the presence of a small amount of undissolved material. In another method, the solution is provided at an initial temperature which is substantially above the melting point of trioxane and the solution is thereafter reduced in temperature from the initial temperature to a lower temperature of at least the melting point of trioxane whereby a small amount of molten trioxane is released from solution. In still another method, a small amount of molten trioxane is added to the solution prior to commencement of the reduction in temperature of the solution below the melting point of the trioxane. The latter method is particularly desirable when solutions of trioxane substantially below saturation are employed in carrying out the invention.

In another aspect of the invention, when unsaturated solutions of trioxanes are employed, as an alternative to adding molten trioxane to the solution, the solution can be maintained at the initial temperature for an extended time period prior to commencing reduction of the temperature of the solution below the melting point of the trioxane.

An important feature of the invention lies in the step of maintaining the trioxane solution in contact with the catalyst at a temperature of at least the melting point of trioxane until polymerization commences or is initiated. When a substantially saturated solution of trioxane is employed and a small amount of undissolved trioxane is present, the initiation or commencement of polymerization occurs substantially immediately with the addition of catalysts to the system. Thus, in the preferred embodiment of the invention, the solution and catalyst can be combined and the gradual reduction in temperature below the melting point of trioxane can be commenced immediately.

It has been found that when undissolved molten trioxane is not present in the reaction system, there is an induction period which can last for from a few minutes to several hours depending on dilution and quantity of catalyst employed before polymerization is initiated. Usually in this situation, small amounts of formaldehyde or low molecular weight polyoxymethylenes are eventually formed which are effective to initiate polymerization, after which the gradual cooling below the melting point of the trioxane can be carried out. It is apparent, therefore, that the process can be carried out with an induction period in the situations where either a saturated or unsaturated solution is employed but no undissolved molten trioxane is present.

When unsaturated solutions of trioxane are employed, the induction period can be substantially shortened by adding a small amount, for example, a few drops, of molten trioxane to the system. After polymerization commences, the process then can be completed by gradually lowering the temperature below the melting point of trioxane.

In order to more clearly describe the invention, the following discussion will be directed primarily to the preferred embodiment of the invention, namely, the embodiment in which a substantially saturated solution of trioxane containing a small amount of undissolved molten trioxane is present in the reaction system prior to decreasing the temperature below the melting point of trioxane. The general conditions employed, including the solvents, catalysts, reaction conditions, etc., will be also applicable to the other embodiments of the invention except where otherwise indicated.

The lowering of the temperature of the trioxane solution is performed at a controlled rate of cooling, and such cooling is preferably carried out with little or no agitation. We have determined that by careful control of the rate of cooling of the trioxane solution, and minimization of agitation or stirring during such cooling, a solid, high molecular weight, polyoxymethylene polymer in the form of fibers of unusually high crystallinity may be prepared in excellent, and heretofore unattainable, yields. By virtue of the improvement in crystallinity and yield of the polymer, the process is well adapted for commercial usage resulting in large scale production.

A salient feature of the invention resides in the recognition of the importance of gradual and controlled temperature reduction of the trioxane solution to effect a gradual crystallization of the monomer from solution. The importance of reducing or eliminating agitation is also considered an important feature of the invention. The crystalline germs which are formed during the gradual and controlled temperature reduction of the trioxane solution are converted into polymeric polyoxymethylene as soon as such crystals form because of the presence in the reaction media of well dispersed, small amounts of an ionic catalyst of the type recognized in the art as effective in the polymerization of trioxane.

In one aspect, the process of the invention is carried out in a batch operation. In another aspect, the process is carried out continuously, for example, in a pipe reactor which is maintained at a gradual decreasing temperature from the inlet end to the exit end.

As hereinbefore indicated, the process is initiated by dissolving in a suitable, nonaqueous, preferably hydrocarbon solvent at temperatures above the melting point of trioxane (61° C.–62° C.), an amount of trioxane, which, due to the decrease of its solubility with decreasing temperature, tends to separate from the solution in the form of very small crystals or crystalline germs as the solution is cooled. The selection of a solvent for the trioxane is of considerable importance and it is obviously a requirement of such solvent that it have a positive thermal coefficient of solution for the trioxane such that the trioxane solubility in the solvent increases with increasing temperature, and conversely, decreases as the solution is cooled. In other words, the dissolution of the trioxane is an endothermic process. Further than this, it is highly desirable that the solvent possess characteristics such that the formation of the crystalline germs of trioxane from the solution is slow, and the germs so formed are small and uniform.

To this end, a solvent having a high viscosity coefficient in the temperature range through which the solution is cooled is to be desired. It is also desirable that the solvent have a viscosity such as to hinder or prevent stratification of the trioxane crystals as they are formed upon reduction of the solution temperature. On the other hand, if the viscosity of the solvent is too high, the rate of growth of germs is too low. The viscosity of the solvent at room temperature may be from about 20 to about 1000 centipoises. However, a viscosity at 20° C. of between 50 centipoises and 400 centipoises is much preferred since, with solvents of this viscosity, yields are greatly improved, and more highly crystalline, higher melting products are obtained. Viscous liquids, such as heavy petroleum fractions, petroleum jellies, such as those sold under the trade name Vaseline, high molecular weight hydrocarbons obtained by polymerization, such as polybutenes and polyphenols, or a viscous polar compound, such as various glycols, polyoxyphenols, halogenated or sulfonated hydrocarbons, or mixtures of the foregoing materials may be employed as a solvent for the trioxane. The hydrocarbon solvents are, however, preferred and we have obtained excellent results using petroleum jelly sold under the trade name Vaseline and having a viscosity of between about 90 centipoises and 200 centipoises at 20° C. The effect of variations in solvent viscosity upon polymer yield and the quality of the polymeric product is set forth in Table 1 hereinafter.

Although the initial temperature of the solution must be substantially at or above the melting point of trioxane (61° C.–62° C.) and is limited in its maximum value only by the stability of the trioxane and the volatility of the solvent employed, it is much preferred to commence the process at a temperature between about 61° C. and about 70° C. In the preferred embodiment of the invention, at this initial temperature, a sufficient quantity of the trioxane is dissolved in the solvent to form a saturated, or near saturated, solution as assured by the presence of small particles of finely dispersed molten trioxane. Although lesser concentrations may be employed, a saturated or near saturated, trioxane solution is preferred in order that formation of the crystalline germs may commence immediately upon the commencement of cooling of the trioxane solution and that reaction start with no induction period. When more dilute solutions are used, the total yield together with molecular weight of polymer decreases. If concentrations greatly exceeding that required to achieve saturation are used, a noticeable part of the monomer remains suspended in the solvent in the molten state and polymerizes instantaneously when catalyst is added. This instantly formed polymeric material is of lower molecular weight than the polymer formed by cooling at controlled rate using saturated or lower concentration solutions. However, a very small amount of undissolved molten trioxane is necessary to avoid the induction period.

It is only necessary that a very small amount of undissolved molten trioxane be present in the reaction system prior to decreasing the temperature below the melting point of trioxane, for example, an amount of trioxane between about 0.01 and about 1.0 percent of the trioxane in solution is very adequate. Of course, larger amounts of undissolved trioxane can be present, however, as pointed out above, this material polymerizes immediately when catalyst is added and forms polymer of lower molecular weight than the desired polymer product.

In the event higher initial temperatures than the preferred range of from 61° C. to 70° C. are employed, the concentration of trioxane in the solvent should be adjusted so that upon cooling the solution, the concentration of trioxane in the solvent will reach the saturation value as the solution temperature approaches the melting point of trioxane such that some molten trioxane separates before reaching that point. When the preferred petroleum jelly (Vaseline) solvent is used, about 1 part by weight of trioxane is dissolved in 10 parts by weight of the solvent in order to saturate the solution at 61° C.

In dissolving the trioxane in the solvent, vigorous mixing or agitation is preferably effected to assure almost complete solution of the trioxane. During such agitation, the solution should be retained at the initial temperature, which, as has been previously indicated, will be at or above the 61° C.–62° C. melting point of the trioxane, and will preferably be between about 61° C. and about 70° C.

A variety of types of trioxane polymerization catalyst may be employed in the process of the invention. In general, those mentioned in the Bruni and Hudgin et al. patents are suitable and include, for example, fluosulfonic acid, thionyl chloride, the halides of boron, aluminum, zinc, zirconium, tin, antimony, bismuth, nickel, titanium, manganese, iron, chromium, vanadium, mercury, silver, ammonium, and phosphorus, mixtures of such metal halides, complexes of the described metal halides with alcohols, phenols, esters, ethers, ketones, aldehydes, organic acids, mercaptans, dialkyl sulfides and organic acid anhydrides, and boron fluoride coordinate complexes with water. Mineral and organic acids, such as sulphuric acid, may also be utilized as the trioxane polymerization catalyst. Of the metal halides which may be employed, the metal fluorides and their organo complexes have been found to be particularly effective in the process of the invention and boron trifluoride etherate is perhaps the most preferred of the catalytic materials which are operative. Small amounts of certain co-catalyst materials, such as small quantities of mineral acids, may also be added to the primary catalyst system for their activating effect.

The amount of catalyst which is utilized in the polymerization reaction is that required to effect the desired reaction, usually from about 0.0005 part per hundred to 1 part per hundred based on the amount of trioxane utilized. Preferably, the amount of catalyst which is introduced to the polymerization system is from about 0.001 to about 0.02 part per hundred based on the amount of trioxane monomer present.

In the preferred embodiment of the invention, after the trioxane has been nearly completely dissolved in its solvent in the manner specified above, and the catalyst has been added to the system at the initial temperature, agitation or stirring of the polymerization system is discontinued and the temperature thereof is gradually lowered. The cessation of agitation and the rate at which the temperature of the system is decreased are important factors in the successful practice of the process of the invention. In some instances, where the catalyst is dissolved in a solvent which is immiscible in the trioxane solvent, it may be necessary, in order to effect polymerization to the desired extent, to very gently agitate the solution during the cooling of the system from the initial temperature. However, such agitation is always to be kept to a minimum or avoided if possible. The effect of varying the extent to which the reaction mixture is agitated during cooling may be better understood by referring to the results tabulated in Table 2 below.

Commencing at the initial temperature which, as has been indicated, will be at or above 61° C. and preferably will fall between 61° C. and about 70° C., the temperature of the system is gradually lowered at a controlled rate of between 4° C. and 20° C. per hour. Preferably, the rate of cooling of the system should be between about 6° C. and about 13° C. per hour. It is generally adequate to cool the system at this rate to about room temperature (about 20° C.) although cooling to a lower temperature may be carried out if necessary to obtain maximum polymerization. If final temperatures higher than about 20° C. are utilized, total yields of the polymer are decreased, and generally, the ratio of lower crystallinity, lower melting polymeric material to the fiber-like, highly crystalline, more desirable polymeric type increases as the final temperature is increased. It will be apparent that, if the initial temperature of the system is between about 61° C. and about 70° C. and the preferred rate of cooling of from about 6° C. to about 13° C. per hour is employed, it will usually require between about 4 and about 12 hours for the trioxane polymerization to be completed upon lowering of the temperature to about 20° C.

We have found in the preferred embodiment of the invention that increasing the rate of cooling to greater than 13° C. per hour results in the production of an excessive number of crystalline germs in a short time period so that not all of the crystalline germs are polymerized before growing into larger crystals which settle out of the system. On the other hand, if a rate of cooling slower than about 4° C. per hour is employed, polymerization in solution is favored with the result that low melting powdery products having a lesser degree of crystallinity and lower molecular weight are produced. In the case of both excessively fast rates of cooling, as well as cooling at too slow a rate, we have found that lower yields of the polyoxymethylene are obtained.

As pointed out previously, it is within the scope of the invention to employ unsaturated solutions of trioxanes as well as substantially saturated solutions. As the amount of trioxane in solution is reduced below saturation, it is found that the desirable rate of cooling increases. While varying degrees of saturation can be employed, it is usually desirable to carry out the invention with solutions containing at least about 85–90 percent of the trioxane required for saturation. When operating with unsaturated solutions, the rate of cooling is greater than with saturated solutions and can vary from between about 10° C. and about 50° C. per hour and more usually between about 20° C. and about 50° C. per hour. Broadly, in carrying out the invention in its various aspects, the cooling rate varies between about 4° C. and about 50° C. per hour.

In carrying out the invention, the cooling rate, once selected, is maintained substantially constant throughout the process. Thus, if a cooling rate of 7° C. per hour is employed initially, the same cooling rate will ordinarily be used throughout the entire cooling operation. Similarly, the rate of cooling over periods of time less than 4° C.–50° C. also is preferably maintained at a substantially constant value. It is to be understood, however, that it is broadly within the scope of the invention to employ different rates of cooling in a single embodiment of the invention. For example, if cooling is carried out over a time period of several hours, a cooling rate of 7° C. per hour can be employed in the first hour, followed by 6.5° C. per hour in the second hour and a slightly different cooling rate for the remainder of the period. The essential feature of the invention in regard to the cooling rate is to provide gradual cooling during the entire process, that is, no rapid or sharp periods of cooling are employed and further to provide a controlled and preferably substantially constant rate of cooling.

The effects of varying the initial and final temperatures, and the rate of cooling of the reaction mixture are illustrated by the results set forth in Tables 3, 4, and 5.

TABLE 1.—EFFECT OF SOLVENT VISCOSITY

[Monomer=30 grams; Solvent=260 grams (No Stirring; Catalyst [1]=0.020 grams)]

| Run | Solvent | Viscosity at 20° C. (Centipoises) | Initial Temperature (° C.) | Final Temperature (° C.) | Cooling Rate (° C./h.) | Polymer | | Total Yields |
|---|---|---|---|---|---|---|---|---|
| | | | | | | Fibers (grams) | Powder (grams) | |
| 1 | n-Nonane | 0.70 | 62.0 | 21.0 | 8.0 | | | |
| 2 | n-Dodecane | 2.0 | 62.0 | 22.1 | 8.0 | | | |
| 3 | Vas. oil | 115.0 | 61.5 | 21.0 | 7.5 | 22.2 | 2.3 | 81.6 |
| 4 | Vas. oil | 152.0 | 62.0 | 21.5 | 8.0 | 23.5 | 1.5 | 83.7 |
| 5 | Vas. oil | 190.0 | 61.3 | 22.3 | 7.5 | 27.2 | 1.3 | 95.0 |
| 6 | Vas. oil [2] | 230.0 | 61.2 | 22.0 | 8.0 | 28.0 | | 93.3 |
| 7 | Vas. oil [2] | 370.0 | 61.5 | 21.2 | 7.5 | 18.3 | 1.2 | 65.0 |
| 8 | Vas. oil [2] | 495.0 | 62.0 | 21.5 | 8.5 | 16.3 | 1.3 | 58.5 |
| 9 | Lubr. oil "H" | 1,220.0 | 62.0 | 22.0 | 8.0 | | | |
| 10 | Vas. oil [2] | 1,600.0 | 61.6 | 21.0 | 8.0 | | | |

[1] Catalyst=BF$_3$.Etherate.
[2] Vaseline oil petroleum jelly thickened with polyisobutylene.

TABLE 2.—EFFECT OF STIRRING

[Catalyst [2]=0.020 ml.]

| Run | Monomer (grams) | Solvent [2] (grams) | Stirring | Temperature (° C.) | Temperature (° C.) | Cooling Rate (° C./h). | Polymer | | Total Yields |
|---|---|---|---|---|---|---|---|---|---|
| | | | | | | | Fibers (grams) | Powder (grams) | |
| 1 | 30 | 250 | No | 61.2 | 21.0 | 8.0 | 26.1 | 2.0 | 93.3 |
| 2 | 31 | 260 | No | 61.0 | 21.5 | 9.0 | 28.5 | 0.3 | 96.3 |
| 3 | 33 | 260 | No | 61.0 | 21.0 | 8.0 | 24.1 | 2.3 | 80.0 |
| 4 | 32 | 280 | No | 61.5 | 21.5 | 9.0 | 27.0 | | 84.5 |
| 5 | 28 | 280 | Vigorous | 61.6 | 20.8 | 7.5 | | 6.0 | 21.0 |
| 6 | 31 | 280 | do | 61.0 | 21.0 | 7.0 | | 6.5 | 21.0 |
| 7 | 30 | 280 | Medium | 61.5 | 20.5 | 8.0 | | 7.0 | 23.3 |
| 8 | 31 | 280 | Slow | 61.5 | 20.8 | 6.5 | 1.5 | 7.1 | 27.7 |
| 9 | 29 | 280 | do | 61.6 | 21.0 | 7.0 | 1.8 | 6.9 | 30.0 |
| 10 | 30 | 280 | do | 61.0 | 20.7 | 8.0 | 1.7 | 5.9 | 25.0 |
| 11 | 31 | 280 | Very slow | 61.5 | 21.0 | 7.0 | 6.0 | 6.7 | 41.0 |
| 12 | 31 | 280 | do | 61.0 | 20.5 | 8.0 | 6.4 | 6.5 | 42.0 |

[1] Catalyst=BF$_3$.Etherate.
[2] Solvent=Vaseline oil petroleum jelly, $d_{20}$=0.827, $\eta_{20}$=109 centipoises. In the amount of solvent indicated, the quantity used for dispersing the catalyst has been included.

TABLE 3.—EFFECT OF INITIAL TEMPERATURE

[Monomer=30 grams, Solvent [1]= 270 grams, Catalyst [2]= 0.025 ml. (No Stirring)]

| Run | Initial Temperature (° C.) | Final Temperature (° C.) | Cooling Rate (° C./h.) | Polymer | | Total Yields |
|---|---|---|---|---|---|---|
| | | | | Fibers (grams) | Powder (grams) | |
| 1 | 80.0 | 21.0 | 8.0 | 15.0 | 4.7 | 65.0 |
| 2 | 78.0 | 21.5 | 8.5 | 15.5 | 4.6 | 67.0 |
| 3 | 76.0 | 21.5 | 8.0 | 16.0 | 4.0 | 66.6 |
| 4 | 74.0 | 21.0 | 8.0 | 18.0 | 4.0 | 73.2 |
| 5 | 70.0 | 21.2 | 8.5 | 17.8 | 4.5 | 74.3 |
| 6 | 65.0 | 21.0 | 8.0 | 21.9 | 1.8 | 79.0 |
| 7 | 62.0 | 22.0 | 8.0 | 26.8 | 1.9 | 95.6 |
| 8 | 59.0 | 21.2 | 8.0 | 26.1 | 1.7 | 92.6 |
| 9 | 57.0 | 21.5 | 8.5 | 16.4 | 1.8 | 60.6 |
| 10 | 55.0 | 22.0 | 8.0 | 12.2 | 1.0 | 44.1 |
| 11 | 50.0 | 21.5 | 8.5 | 2.1 | 1.0 | 10.0 |
| 12 | 45.0 | 21.2 | 8.0 | 1.2 | 0.5 | 5.6 |
| 13 | 40.0 | 21.0 | 8.5 | 1.0 | 0.3 | 4.3 |

[1] Solvent=Vaseline oil petroleum jelly, $d_{20}$=0.887, $\eta_{20}$=109 centipoises.
[2] Catalyst=BF$_3$.Etherate.

TABLE 4.—EFFECT OF FINAL TEMPERATURE

[Catalyst [1]=0.020 ml., No Stirring]

| Run | Monomer (grams) | Solvent [2] (grams) | Initial Temperature (° C.) | Final Temperature (° C.) | Cooling Rate (° C./h.) | Polymer Fibers (grams) | Polymer Powder (grams) | Total Yields |
|---|---|---|---|---|---|---|---|---|
| 1 | 30 | 270 | 62.0 | 21.5 | 8.5 | 26.8 | 1.9 | 95.6 |
| 2 | 30 | 280 | 61.5 | 25.6 | 8.5 | 23.0 | 1.5 | 81.7 |
| 3 | 30 | 270 | 62.1 | 28.3 | 8.0 | 21.0 | 1.8 | 76.0 |
| 4 | 30 | 280 | 62.0 | 30.0 | 9.0 | 19.2 | 1.8 | 70.0 |
| 5 | 29 | 260 | 61.5 | 32.2 | 8.5 | 18.0 | 2.0 | 69.0 |
| 6 | 29 | 260 | 61.9 | 34.0 | 8.5 | 14.2 | 2.0 | 54.0 |
| 7 | 30 | 270 | 62.0 | 38.1 | 8.0 | 12.0 | 2.9 | 49.6 |
| 8 | 30 | 270 | 62.0 | 40.0 | 9.0 | 10.5 | 2.8 | 44.3 |
| 9 | 28 | 250 | 62.5 | 45.6 | 8.5 | 8.0 | 3.1 | 39.6 |
| 10 | 30 | 260 | 61.8 | 48.0 | 8.0 | 3.0 | 4.2 | 24.0 |
| 11 | 31 | 280 | 62.0 | 50.5 | 9.0 | 1.5 | 4.8 | 20.3 |
| 12 | 30 | 270 | 62.0 | 55.2 | 8.0 |  | 5.3 | 17.6 |

[1] Catalyst=BF$_3$.Etherate.
[2] Solvent=Vaseline oil petroleum jelly, $d_{20}$=0.887, $\eta_{20}$=109 centipoises.

TABLE 5.—EFFECT OF COOLING RATE

[Monomer=30 grams, Solvent [1]=250 grams, Catalyst [2]=0.015 ml. (No Stirring)]

| Run | Initial Temperature (° C.) | Final Temperature (° C.) | Cooling Rate (° C./h.) | Polymer Fibers (grams) | Polymer Powder (grams) | Total Yields |
|---|---|---|---|---|---|---|
| 1 | 61.2 | 21.0 | 4.0 |  | 8.0 | 26.7 |
| 2 | 61.0 | 20.9 | 5.5 |  | 7.5 | 25.0 |
| 3 | 61.6 | 21.1 | 6.0 | 6.1 | 6.8 | 43.0 |
| 4 | 61.3 | 20.1 | 7.0 | 9.3 | 5.5 | 44.3 |
| 5 | 61.5 | 19.8 | 8.0 | 13.2 | 5.1 | 61.0 |
| 6 | 61.0 | 22.0 | 9.0 | 20.1 | 4.5 | 82.0 |
| 7 | 61.6 | 21.5 | 9.5 | 20.2 | 3.8 | 80.0 |
| 8 | 61.5 | 21.2 | 10.0 | 21.9 | 2.5 | 81.3 |
| 9 | 61.0 | 20.8 | 11.0 | 23.0 | 1.6 | 82.0 |
| 10 | 61.2 | 21.0 | 11.5 | 24.0 | 1.5 | 85.0 |
| 11 | 61.3 | 20.8 | 12.0 | 22.0 | 1.3 | 77.7 |
| 12 | 61.0 | 19.8 | 12.5 | 18.8 | 1.3 | 67.0 |
| 13 | 61.6 | 21.0 | 12.8 | 15.0 | 1.2 | 54.0 |
| 14 | 61.1 | 22.0 | 13.0 | 10.2 | 1.2 | 38.1 |
| 15 | 61.0 | 21.0 | 14.0 | 6.5 | 1.5 | 26.7 |

[1] Solvent=Vaseline oil petroleum jelly, $d_{20}$=0.887, $\eta_{20}$=109 centipoises.
[2] Catalyst=BF$_3$.Etherate.

Operating in the manner described above, at the end of the reaction, the reaction mass (solvent plus polymer) will generally have the consistency of a solid. The mass may be softened by moderate warming, then filtered off, and the filter cake thoroughly washed with low boiling solvents to remove the trioxane solvent which has been used as the reaction medium. Washing may be carried out in several steps, using different solvents, such as light hydrocarbons and oxygenated organic compounds like acetone, ether, etc., depending upon the nature of the reaction medium. The polyoxymethylene product, when washed and dried, has a felt-like structure and is composed of small needles of polymer which can be seen with the naked eye and magnified by a microscope, appear like elongated fibers. The melting point of this polyoxymethylene polymer is 186° to 187° C. When optimum or preferred reaction conditions are utilized, practically all of the solid polymer produced is the highly crystalline, high melting point fiber-like material. However, within the operative limits of prescribed process conditions, but outside the preferred ranges, a portion of the polymeric product is constituted by a powdery, more granular material which melts at a lower temperature and is characterized by a lower molecular weight than the fibrous material, and in general, has relatively less desirable physical properties, and thermal stability.

Stabilization of the polymer may be accomplished using stabilizing agents and methods well known to the art. Examples of suitable stabilizing compounds include, but are not limited to, acetic anhydride, acyl chlorides, isocyanates and methyl sulfate. A preferred agent for stabilizing the polyoxymethylene polymers of the present invention is acetic anhydride and the stabilization is carried out in the presence of sodium acetate. During stabilization of the polymer by acetic anhydride in the presence of sodium acetate as a stabilization catalyst, a temperature of 190° C. and super-atmospheric pressures are required to dissolve the fiber-like high melting polymer samples in the acetic anhydride. On the other hand, the powdery, more granular material obtained within operative limits described above may be dissolved in the acetic anhydride at a temperature of 150° C. This difference in solubility of the two types of material produced provides a basis for their separation from each other.

X-ray examination of the powdery polymeric product and dynamic mechanical spectrum indicate that the polymer is partially crystalline. On the contrary, X-ray examination of fiber-like polymer showed a degree of crystallinity of the order of 90–98 percent with orientation of crystals along C axis. The Youngs Modulus of the fiber-like highly crystalline samples before stabilization as determined by a dynamic method at medium frequency is $5.0 \times 10^{10}$ dynes cm.$^{-2}$ at 20° C. The inherent viscosity of the fiber-like polymer in p-chlorophenol with 2 percent α-pinene at 60° C. is 1.10 to 1.11. The inherent viscosity of the powdery, lower melting polymer, on the other hand, is from 0.81 to 0.82 when measured using p-chlorophenol as the solvent at 60° C. By following the controlled rate of cooling and suppressing agitation in the manner described above, it is possible to repeatedly obtain yields of the polyoxymethylene polymer exceeding 95 percent of theory.

The process of the present invention as hereinbefore described may be carried out as either a batch process or on a continuous basis. On an industrial scale, the batch polymerization can be accomplished in closed vessels containing some type of cooling surfaces, such as jacketed cooling coils, a means of agitation and a feed inlet and product outlet. A continuous procedure may, on the other hand, be utilized by carrying out the process in an elongated reaction zone, e.g., a continuous converter coil, which is maintained at gradually decreasing temperature from one end thereof to the other, such as by a series of thermostatically controlled jackets. The coil is fed by a high pressure pump and fluid flow is maintained at a rate such that vicsous, laminar flow of the reaction mass is maintained in the reaction coil. The product is collected at the coolest end of the coil in the form of a cylinder of semi-solid consistency which can be treated with light solvents, filtered off, washed and dried in the manner previously indicated.

The following examples will serve to better illustrate the practice of the invention, and also will illustrate the results obtained when the conditions hereinbefore prescribed are not strictly adhered to in the practice of the invention.

*Example 1*

40 grams of commercial grade trioxane were melted and filtered to eliminate higher molecular weight impurities. The trioxane was then mixed with 370 grams of Vaseline oil (a purified, semi-solid mixture of hydrocarbons derived from petroleum and having a specific gravity of from 0.815 to 0.880 at 60° C. and a melting point range of from 0° C. to 60° C.) at 63° C. in a thermostatic bath, the mixture was vigorously agitated to assure solubilization of the majority of trioxane, leaving a small amount of it in the molten state, suspended in the Vaseline oil.

0.01 milliliter of boron trifluoride etherate suspended in 30 grams of Vaseline oil at room temperature was added.

After the addition of the catalyst, the agitation was then completely stopped and the temperature of the mixture was slowly lowered by circulating water of gradually decreasing temperature through a jacket of the reaction vessel and through coils immersed in the reaction mixture. The rate of cooling was 8° C. per hour. As the temperature was lowered, the formation of white needles of polymer was observed. The polymer did not tend to settle out on the bottom of the reaction vessel, but instead, remained well suspended in the medium. At a temperature of about 35° C., the reaction mass assumed a milk white color and a semi-solid consistency. At room temperature, no further reaction could be detected.

After completion of the reaction, the vessel was warmed to between 60 and 70° C. to soften the polymer-Vaseline oil mixture. The mixture was then filtered under vacuum and the filter cake washed with petroleum ether. Following drying of the polymeric needles, the polymer in the form of consistent elongated fibrous needles was acetylated under nitrogen using acetic anhydride in the presence of sodium acetate. Only a small fraction of the polymer dissolved at the normal boiling point of acetic anhydride, thus requiring superatmospheric pressures in addition to a temperature of 190° C. to effect the solution of a majority of the polymer mass in the acetic anhydride. The melting point of the needles of polymer prior to stabilization by acetylation was found to be 186° C. A yield of the polymer of 94 percent was obtained.

*Example 2*

6 kilograms of commercial grade trioxane were melted and filtered to remove high molecular weight impurities. The trioxane was then mixed with 50 kilograms of Vaseline oil and the mixture kept in a reactant make-up tank till a nearly homogeneous mixture, with only a small amount of unsolved molten trioxane, was obtained. Successively, 2 milliliters of $BF_3$. Etherate suspended in 200 grams of Vaseline oil at room temperature were added to the trioxane solution. Addition of the catalyst suspension was made with simultaneous agitation of the reaction mixture.

The homogeneous reaction mixture from the make-up tank was then pumped through a continuous steel converter coil 60 meters in length and 50 millimeters in diameter. The rate of the transmission of the reaction mixture through the coil was about 30 liters per hour. The converter coil was jacketed throughout its length with a series of six independent cooling jackets which were kept at six different decreasing temperatures between 55° C. and 18° C. At the end of the converter coil, a semi-solid cylinder of polymer and reaction medium was collected. The polymer was then removed from the Vaseline filtration in a filter press. The polyoxymethylene filter cake was washed in two successive washings with benzene and petroleum ether and then was dried.

The material thus recovered was determined by analysis to be comprised of a high molecular weight, highly crystalline polyoxymethylene having a melting point of 186 to 187° C. Macroscopic and microscopic examination of the polymer revealed a fiber-like structure. The yield of the polymer was 90 percent.

*Example 3*

30 grams of commercial grade trioxane which had been previously purified in the manner described in Examples 1 and 2 were mixed with 270 grams of Vaseline oil having a viscosity at 20° C. of 103 centipoises. The Vaseline-trioxane solution containing some particles of molten trioxane in suspension was kept at a temperature of 61° C. in a thermostated vessel and vigorously agitated. During the isothermal agitation of the Vaseline-trioxane solution, a suspension of 0.025 milliliter of boron trifluoride etherate in 20 grams of Vaseline oil was introduced to the trioxane solution.

Following addition of the catalyst suspension, agitation was stopped and the temperature of the reaction mass was lowered at a rate of 6.5° C. per hour. During cooling of the reaction mixture, formation of fiber-like polymer particles commenced to occur, and the polymer particles remained well suspended in the reaction medium. As cooling continued, gradual thickening of the reaction mixture was observed. The mass became very compact and semi-solid in consistency when a temperature of 38° C. was reached.

After room temperature of approximately 20° C. was reached, the reaction mixture was retained at this temperature for a period of about 12 hours and was then warmed to 70° C. and filtered under vacuum. The solid polymer which was separated from the Vaseline solvent by filtration was then washed with petroleum ether and dried. The polymer formed a felt-like mass which was composed of long fibers of high molecular weight material having a melting point of 186 to 187° C. A very small percentage of a powdery, high molecular weight material having a melting point of 176° C. to 180° C. was observed in the network of fibers of the higher melting polymer. Total yield of the polymer was 93 percent. Stabilization of the product was accomplished by treatment with acetic anhydride in the presence of about 0.01 percent by weight sodium acetate.

*Example 4*

31 grams of purified trioxane were mixed with 260 grams of Vaseline oil having a viscosity at 20° C. of 109 centipoises. The temperature of the mixture was maintained at 61.5° C. in a thermostated vessel while simultaneously agitating the mixture till nearly complete dissolution of trioxane. To the mixture, consisting of a saturated trioxane solution with a small quantity of suspended molten trioxane, 0.01 milliliter of boron trifluoride etherate catalyst suspended in 25 grams of Vaseline oil was added while continuing agitation of the reaction mass. After addition of the catalyst, the agitation of the mass was stopped and the temperature lowered at a rate of 8° C. per hour. When a temperature of 40° C. was reached, the reaction mass acquired a hard consistency.

When the reaction mixture reached ambient or room temperature, the reaction mass was then warmed up to 65° C., filtered and the residue washed with petroleum ether. The reaction product had a felt-like feel and was composed of long fibers of a high molecular weight, high melting point (186 to 187° C.) polymer. The yield obtained was 90 percent.

After stabilization, accomplished by esterifying the polymer with acetic anhydride in the presence of 0.05 percent by weight sodium acetate at 190° C., the product of the reaction could be molded and extruded without decomposition.

*Example 5*

32 grams of commercial grade trioxane previously purified by the removal of higher molecular weight impurities were added to 280 grams of Vaseline oil having a viscosity of 109 centipoises at 20° C. To the mixture (trioxane solution with traces of molten trioxane in suspension) maintained at a constant temperature of 63.5° C. in a thermostated vessel, a suspension of 0.02 milliliter of bordon trifluoride etherate in 20 grams of Vaseline oil was added while agitating the reaction mass.

When all the catalyst was added, agitation was terminated and the mass permitted to cool at a rate of 9° C. per hour. As the temperature was lowered, the consistency of the reaction mass became increasingly thicker while a gradual formation of a fiber-like substance occurred, which fiber-like substance remained well dispersed in the reaction medium. After having been cooled to room temperature, the reaction mixture was warmed to 65° C., filtered and the residue thoroughly washed with petroleum ether. The product of polymerization was a felt-like mass formed by long fibers of polymer having a melting point of 186 to 187° C. A yield of 95 percent was obtained.

The foregoing examples serve to illustrate the preferred embodiment of the process of the present invention within the specified conditions to obtain optimum yield of polymer products. To illustrate the effect of departure from the conditions hereinbefore enumerated for carrying out the reaction, the following examples are set forth. In Examples 6 and 7, the effects of employing a cooling rate exceeding that hereinbefore specified and also a cooling rate which is slower than that prescribed respectively, are shown.

*Example 6*

20 grams of commercial grade trioxane were melted at 65° C. and filtered to eliminate high molecular weight impurities. The purified trioxane was then mixed with 185 grams of Vaseline oil having a viscosity of 20° C. of 160 centipoises. The trioxane-Vaseline mixture containing some unsolved molten trioxane was agitated at 62° C. in a thermostated vessel and during the agitation, a suspension of 0.01 milliliter of boron trifluoride etherate suspended in 25 grams of Vaseline oil ($\eta_{20}$=160 centipoises) was added while continuing the stirring.

After addition of the catalyst, the stirring was stopped and the mass was permitted to cool at a rate of 25° C. per hour. During cooling of the reaction mixture, the formation of a small quantity of powdery material which deposited at the bottom of the vessel was observed.

After cooling to room temperature, the mixture was warmed up to 65° C. and filtered under vacuum while still hot. Only a small quantity of polymeric powdery material remainder on the filter constituting about 3 percent by weight of the total quantity of trioxane used. This powdery material melted at 178–180° C. The majority of the trioxane remained unreacted and a minor quantity was transformed into polymeric fibers. Total yields were only 22 percent.

*Example 7*

To 220 grams of Vaseline oil having a viscosity of 160 centipoises at 20° C. was added 25 grams of purified commercial trioxane. The Vaseline solution containing small amounts of unsolved molten trioxane was kept at 63° C. in a thermostated vessel and the solution agitated vigorously while 0.015 milliliter of boron trifluoride etherate suspended in 30 grams of Vaseline oil was added.

After addition of the catalyst, agitation was stopped and the reaction mixture was cooled at the rate of 3° C. per hour. After the reaction mixture reached room temperature of about 20° C., the mixture was warmed to 65° C. and filtered. The solid residue remaining after filtration was washed with petroleum ether, dried and examined under a microscope. The residue appeared to be formed by a mixture of powdery particles which were subsequently determined to have a melting range of from about 170° C. to about 176° C. together with a minor proportion of fiber-like particles having a melting point of 186 to 187° C. After extraction of the powdery material with boiling acetic anhydride, a residue of fibrous polymeric material constituting about 30 percent of the total solid product recovered upon filtration was obtained. The total yield of both the powdery material and the fibrous particles was 20 percent.

Examples 8 and 9 illustrate the adverse effect which is obtained when stirring or agitation of the reaction mixture is continued through the phase of the reaction involving the gradual reduction of temperature.

*Example 8*

A mixture of 37 grams of purified commercial grade trioxane in 320 grams of Vaseline oil having a viscosity of 96 centipoises at 20° C. was formed by vigorous agitation and heating the mixture to 63° C. When trioxane was nearly completely dissolved, 0.015 milliliter of boron trifluoride etherate suspended in 20 grams of the Vaseline oil (viscosity of 96 centipoises at 20° C.) was added to the mixture whie continuing agitation.

Successively, the mixture was cooled to room temperature at a rate of 6° C. per hour while continuing vigorous agitation of the mixture (200 to 250 stirrer revolutions per minute). After the mixture reached room temperature, the mixture was warmed to 65° C., filtered and the solid residue recovered upon filtration was thoroughly washed with petroleum ether. The polymeric product so recovered consisted of a powdery material which melted between about 160° C. and about 170° C. A yield of 32 percent was obtained.

*Example 9*

28 grams of commercial grade trioxane previously purified in the manner hereinbefore specified were mixed with 250 grams of Vaseline having a viscosity at 20° C. of 101 centipoises. The trioxane solution containing small amounts of molten trioxane in suspension was mixed at 63° C. under agitation with a suspension of 0.018 milliliter of boron trifluoride etherate suspended in 20 grams of Vaseline oil was added. Following the addition of the catalyst suspension, agitation was reduced from a stirrer speed of from 200 to 250 revolutions per minute to only 10 to 15 revolutions per minute and the reaction mass was allowed to cool at a rate of 8° C. per hour while continuing agitation at such reduced rate.

After reaching room temperature, the reaction mixture was again warmed to 65° C., filtered, and the solid residue washed with petroleum ether. The polymer product was formed by a mixture of fiber-like material having a melting point of 186 to 187° C. and a powdery material having a lower melting range of between about 160° C. and about 170° C. A total solids yield of 60 percent was obtained, about 70 percent of which was constituted by the powdery low melting material.

Examples 10 and 11 serve to illustrate the effect of varying the ratio of trioxane monomer to the solvent employed.

*Example 10*

30 grams of commercial grade trioxane which had been previously purified to remove high molecular weight impurities were mixed with 150 grams of Vaseline oil having a viscosity of 106 centipoises at 20° C. The mixture was retained at 63° C. in a thermostated bath and simultaneously agitated.

While maintaining the temperature at 63° C. and continuing vigorous agitation of the mixture, a suspension of 0.04 milliliter of boron trifluoride etherate in 20 grams of Vaseline oil was added. During the addition of the catalyst to the Vaseline solution of the trioxane, a noticeable part of the trioxane material in the reaction mixture rapidly polymerized. After addition of the catalyst, stirring was stopped and the temperature of the mixture was slowly lowered at the rate of 12° C. per hour until room temperature was reached.

After having been allowed to stand at room temperature for about 4 hours, the reaction mass was then warmed to 65° and filtered under vacuum while still hot. The residue from the filtration was washed with petroleum ether and dried. Under the microscope, the filtration residue appeared to be formed by a mixture of powdery particles and fibrous particles. The powdery material was determined to have a melting range between about 170° C. and about 180° C., while the fibrous particles were characterized by a melting point of 186° C. to 187° C.

Separation of the powdery material from the fiber-like polymer was achieved by treating the solid mixture with boiling acetic anhydride in which the powdery material was soluble, but the fiber-like material insoluble. After this treatment, a residue of completely fibrous material remained, which constituted about 55 percent of the entire weight of solid material. A total yield of powdery and fibrous solid material of 92 percent was obtained.

*Example 11*

15 grams of commercial grade trioxane previously purified as indicated in the preceding examples, were mixed with 280 grams of Vaseline oil having a viscosity of 190 centipoises at 20° C. The trioxane solution was kept at 63° C. in a thermostated bath while the mixture was vigorously agitated to assure complete solubilization of the trioxane in the oil. Following complete solubilization of the trioxane, a suspension of 0.005 gram of boron trifluoride etherate suspended in 10 grams of Vaseline oil was added to the trioxane solution while continuing agitation. After addition of the catalyst, the mixture was allowed to cool to room temperature at a rate of 8° C. per hour and was then permitted to stand at room temperature for 4 hours. At the end of this time, the mixture was warmed to 65° C. and filtered. The residue which was removed by filtration, was washed with petroleum ether, and after drying was examined under a microscope. It was found that the solid residue was composed of a mixture of powdery polymeric material having a melting range of from 170° C. to 180° C. and a minor proportion of a fiber-like material having a melting point of 186 to 187° C. The powdery material, which could be extracted by boiling acetic anhydride, constituted about 90 percent of the total solid product. The total yield obtained in the polymerization reaction was 25 percent.

Examples 12 and 13 demonstrate the effect of varying the viscosity of the solvent utilized to dissolve the trioxane monomer.

*Example 12*

28 grams of commercial grade trioxane were purified by melting at 65° C. and filtering to remove high molecular weight impurities. The purified trioxane was then mixed with 230 grams of a lubricating oil having a viscosity at 20° C. of 1220 centipoises. The reaction mixture composed by trioxane solution plus molten suspended trioxane was maintained at 63° C. in a thermostated bath and was vigorously agitated. While retaining the mixture at the specified temperature and during the continuation of the agitation, a suspension of 0.015 milliliter of boron trifluoride etherate in 20 grams of the lubricating oil was added to the thermostated vessel. When the mixture was homogeneous as a result of the agitation, the agitation was stopped and the mass allowed to cool at a rate of 10° C. per hour. After having reached room temperature, the reaction mixture was permitted to stand for 10 hours. No polymerization occurred.

*Example 13*

140 grams of purified commercial grade trioxane were added to 290 grams of n-heptane having a viscosity of about 0.6 centipoise at 20° C. The n-heptane saturated solution of the trioxane was kept at 62.5° C. in a thermostated vessel. While vigorously stirring the trioxane solution, a suspension of 0.01 milliliter of boron trifluoride etherate in 20 grams of n-heptane was added to the reaction mixture. After addition of the catalyst, agitation was ceased and the reaction mixture allowed to cool to room temperature at a rate of 7.5° C. per hour. During cooling of the reaction mixture, formation of very long transparent needles of trioxane was observed.

After cooling to room temperature, the reaction mass was warmed to 65° C. and filtered while hot under vacuum. There remained, following filtration, only a very small residue of solid material on the filter. The solid residue was formed by a powdery high molecular weight material which melted between 160 and 170° C. A yield of only 5 percent was attained.

Examples 14 and 15 illustrate the effects of varying the final temperature to which the polymerization reaction is lowered, and of varying the initial temperature of the reaction mixture prior to the commencement of temperature reduction.

*Example 14*

25 grams of purified commercial grade trioxane were mixed with 280 grams of Vaseline oil and the mixture retained at 63° C. during vigorous agitation. After the obtainment of a nearly homogeneous mixture of the trioxane in the Vaseline oil with small amounts of unsolved molten trioxane, 0.015 milliliter of boron trifluoride etherate dispersed in 30 grams of Vaseline oil was added to the mixture while continuing vigorous stirring. When all the catalyst suspension had been added, the reaction mixture was cooled without stirring at a rate of 10° C. per hour from 63° C. to 50° C. The reaction mixture was retained at 50° C. for a period of 5 hours. The mixture was then heated to 65° C. and the reaction product recovered by filtration and washed with petroleum ether.

The solid product consisted of a mixture of powdery material having a melting range of 160 to 170° C. with a minor portion of fiber-like material having a melting point of 186 to 187° C. The fiber-like material constituted about 20 percent of the entire solid product and the total yield of solid product was about 30 percent.

*Example 15*

20 grams of commercial grade trioxane were melted by heating to 75° C., filtered to eliminate high molecular weight impurities, and mixed with 150 grams of Vaseline oil having a viscosity of 109 centipoises at 20° C. The mixture was maintained at 75° C. in a thermostated vessel and vigorously agitated. To this mixture, containing some molten trioxane in suspension, 0.01 milliliter of boron trifluoride etherate suspended in 20 grams of Vaseline oil was added, while continuing agitation.

Then, stirring of the reaction mixture was stopped and the mass was allowed to cool at a rate of 12° C. per hour. During cooling from 75° C. to about 60° C., formation of a powdery substance which deposited at the bottom and on the walls of the reaction vessel was observed. Cooling of the mixture was continued until room temperature was reached. The reaction mixture was then warmed to 65° C., filtered and the solid residue washed and dried.

Examination of the solid residue remaining from filtration under a microscope revealed that it was formed by a large quantity of fiber-like material which was characterized by a melting range from 185–187° C., accompanied by a smaller proportion of fiber-like polymeric material having a melting point of 178–180° C. Total yield of solid material was of 85 percent.

Examples 16, 17 and 18 illustrate the effect of attempting to achieve polymerization and the production of a highly crystalline polyoxymethylene by carrying out the polymerization isothermally.

*Example 16*

18 grams of purified commercial grade trioxane were mixed with 160 grams of Vaseline oil having a viscosity of 106 centipoises at 20° C. The mixture was maintained at 62° C. in a thermostated vessel and vigorously agitated until a nearly homogeneous solution containing some molten unsolved trioxane was obtained. While the agitation was continued, a suspension of 0.005 milliliter of boron trifluoride etherate in 35 grams of the Vaseline oil was added to the trioxane solution.

After all of the catalyst was added, agitation was stopped and the reaction mass was allowed to stand for 8 hours while maintaining the reaction mixture at a temperature of 62° C. ±0.5° C. The reaction mixture was then filtered, and the solid residue remaining after filtration was cooled and washed with petroleum ether. The solid residue was completely constituted by a powdery polymeric material which melted in the range of from about 178° C. to about 180° C. A yield of 60 percent of the solid product was obtained.

*Example 17*

40 grams of purified commercial grade trioxane were added to 390 grams of Vaseline oil having a viscosity of 109 centipoises at 20° C. The trioxane-Vaseline system was kept at 55° C. in a thermostated bath and thoroughly agitated. While continuing the agitation, 0.01 milliliter of boron trifluoride etherate suspended in 40 grams of Vaseline oil was added to the nearly homogeneous trioxane solution.

Agitation was stopped following the addition of the catalyst suspension and the reaction medium was maintained for 10 hours at 55° C. ±0.5° C. The solid reaction product was recovered by filtration and was washed with petroleum ether. It constituted a powdery polymeric material which melted at from 178° C. to 180° C. The yield of the solid product obtained was 35 percent.

*Example 18*

A mixture of 26 grams of purified commercial grade trioxane in 220 grams of Vaseline oil having a viscosity of 99 centipoises at 20° C. was prepared and was retained in a thermostated vessel at 65° C. while agitating the solution vigorously till nearly homogeneous solution was obtained with some unsolved molten trioxane suspended. This was allowed to cool from the initial temperature to 45° C. and was retained at this temperature until thermal equilibrium was approached.

After equilibration of the solution at 45° C., a suspension of 0.015 milliliter of boron trifluoride etherate in 20 grams of Vaseline oil was added to the solution. The addition was accomplished while the trioxane solution was vigorously agitated. When all of the catalyst suspension had been added, agitation was stopped and the reaction mixture was retained at a constant temperature of 45° C. ±0.5° C. for a period of 12 hours. At the end of this period, the reaction mass was warmed to 65° C., filtered and the solid residue recovered upon filtration and washed with petroleum ether. The solid product thus recovered consisted of a powdery material having a melting range of from about 166° C. to about 170° C. A yield of 25 percent was obtained.

Example 19 demonstrates the effect of utilizing sulphuric acid as catalytic material in the process of the present invention.

*Example 19*

34 grams of commercial grade trioxane which had been previously purified in the manner prescribed in the foregoing examples were mixed with 280 grams of Vaseline oil having a viscosity of 109 centipoises at 20° C. The mixture was kept at 61° C. in a thermostated vessel and agitated in order to dissolve nearly all the trioxane. Successively, 0.025 milliliter of concentrated sulphuric acid suspended in 15 milliliters of Vaseline oil was added to the trioxane solution. During the addition of the sulphuric acid suspension, vigorous agitation of the reaction mixture was continued. As the sulphuric acid suspension was added to the trioxane solution, some decomposition of the monomer occurred with formation of a yellow-brown precipitate.

After all of the catalyst suspension had been added, the reaction mass was allowed to cool at a rate of 10° C. per hour without agitation. After the reaction mixture had reached room temperature, the solid reaction product was recovered by heating the mixture to 65° C., filtering, and then washing the solid product with petroleum ether. The solid material appeared to be a high molecular weight material having a fibrous appearance and melting in the range of from about 110° C. to about 120° C. A yield of 40 percent was obtained.

Examples 20 and 21 illustrate the effect of varying the nature of the trioxane solvent employed.

*Example 20*

100 grams of commercial grade trioxane were melted by heating to 65° C. and then filtered to eliminate higher molecular weight impurities. The purified trioxane was then mixed with 260 grams of a Vaseline oil-dinonylsebacate mixture (80/20 parts by volume). The Vaseline oil-dinonylsebacate mixture had a viscosity of 87 centipoises at 20° C. The mixture was maintained at 62° C. in a thermostated bath and agitated vigorously until a nearly complete dissolution of trioxane was obtained. While continuing the agitation, a suspension of 0.02 milliliter of boron trifluoride etherate in 25 grams of the Vaseline oil-dinonylsebacate mixture was added to the trioxane solution.

After the reaction mixture was completely homogenized, agitation was stopped and the reaction mixture cooled at a rate of 10° C. per hour until room temperature was reached. The reaction mass was then warmed to 65° C., filtered, and the solid residue recovered from the filtration was washed with petroleum ether. The polymerization product consisted of fibrous particles having a melting point of 186° C. to 187° C., together with a small percentage (4 percent by weight) of powdery polymer. The melting range of the powdery material was from 140° C. to 160° C. The yield of total solid polymerization products was 90 percent.

*Example 21*

To 370 grams of polyisobutylene (molecular weight: 200–250) were added 40 grams of previously purified commercial grade trioxane. The mixture, containing small amounts of unsolved molten trioxane in suspension, was agitated while maintaining a temperature of 63° C. in a thermostated vessel. While continuing the agitation, a suspension of 0.015 milliliter of boron trifluoride etherate in 20 grams of polyisobutylene was added to the trioxane solution. After addition of the catalyst, the agitation was stopped and the reaction mixture allowed to cool to room temperature at a rate of 10° C. per hour. When room temperature was reached, the reaction mass was warmed to 65° C. and filtered. Only a very small amount of powdery residue of polymeric material having a melting point of 179 to 180° C. remained on the filter.

The effect of varying the ratio of catalyst to trioxane monomer is illustrated by Examples 23, 24 and 25.

*Example 22*

40 grams of purified commercial grade trioxane were mixed with 360 grams of Vaseline oil having a viscosity at 20° C. of 96 centipoises. The trioxane-Vaseline mixture containing small quantities of unsolved molten trioxane in suspension was maintained at 62° C. in a thermostated vessel and agitated to homogenize the mixture. Then, 0.08 milliliter of boron trifluoride etherate dispersed in 15 grams of Vaseline oil was added to the mixture.

After all of the catalyst had been added, agitation was stopped and the mixture was allowed to cool to room temperature at a rate of 8.5° C. per hour. After reaching room temperature, the mixture was warmed up to 65° C., filtered and the residue washed with petroleum ether. The solid reaction product was constituted by a mixture of a fiber-like material having a melting point of 186 to 187° C. together with a smaller proportion of a powdery substance having a melting point of 179° to 180° C. The total solids yield was 88 percent.

Example 23

280 grams of commercial grade trioxane previously purified to remove high molecular weight impurities were mixed with 2000 grams of Vaseline oil having a viscosity of 96 centipoises at 20° C. The mixture composed by the trioxane solution with a small quantity of unsolved molten trioxane was kept at 63° C. in a thermostated vessel and agitated to promote solubilization of the majority of the trioxane in the Vaseline oil. Successively, 0.06 milliliter of boron trifluoride etherate dispersed in 30 grams of Vaseline oil was added to the trioxane solution while continuing the agitation of the reaction mixture.

After all of the catalyst had been added, agitation was stopped and the mixture was cooled at the rate of 12.5° C. per hour from the initial temperature of 63° C. to a room temperature of about 20° C. After reaching room temperature, the mixture was warmed up to 65° C., the solid polymer which was formed during the cooling of the reaction mixture was filtered, and the solid residue washed with petroleum ether. The solid product was a fibrous polymeric material having a melting point of 186 to 187° C. A yield of 85 percent was realized.

Example 24

500 grams of commercial grade trioxane previously purified in the manner hereinbefore specified were mixed with 4000 grams of Vaseline oil having a viscosity at 20 C. of 109 centipoises. The mixture was kept at a temperature of 61° C. in a thermostated vessel under agitation. To the mixture containing small amounts of molten unsolved trioxane, 0.005 milliliter of boron trifluoride etherate dispersed in 20 grams of Vaseline oil was added while continuing the agitation. After all of the catalyst had been added, agitation of the mixture was stopped and the mixture was allowed to cool to room temperature at a rate of 8.5° C. per hour.

After the mixture had reached room temperature, it was again warmed to 65° C., filtered and the solid residue washed with petroleum ether. The residue from the filtration was composed of a fibrous polymeric material having a melting point of 186 to 187° C. A yield of 60 percent was achieved.

The following examples are presented to illustrate aspects of the invention wherein unsaturated solutions of trioxane are employed and the effect of varying the cooling rate.

Example 25

27 grams of purified commercial grade trioxane were mixed with 300 grams of Vaseline oil having a viscosity of 106 centipoises at 20° C. The mixture was maintained at 63° C. in a thermostated vessel and vigorously agitated till all trioxane was dissolved. While the agitation was continued a suspension of 0.025 milliliter of boron trifluoride etherate in 20 grams of Vaseline oil was added to the solution.

After all of the catalyst was added, agitation was stopped and a few drops of molten trioxane added to the solution.

After that, cooling was started at the rate of 30° C. per hour till room temperature was reached. The reaction mixture was then filtered and the solid residue remaining after filtration was washed with petroleum ether. The solid residue was completely constituted by a fiberlike polymeric material which melted at 186–187° C. A yield of 60 percent of the solid product was obtained.

Example 26

24 grams of purified commercial grade trioxane were added to 300 grams of Vaseline oil having a viscosity of 98 centipoises at 20° C., kept in a thermostat at 62° C., under agitation till it was completely solubilized. Successively, 0.025 milliliter of boron trifluoride etherate in 20 grams of Vaseline oil were added to the reaction mixture.

After addition of the catalyst, agitation was ceased and the reaction mixture left for 20 minutes at the initial temperature. After the induction period, the reaction mass was allowed to cool at the rate of 40° C. per hour.

After cooling to room temperature, the reaction mixture was warmed at 65° C. and filtered while hot under vacuum. There remained, following filtration, a large amount of fiberlike polymeric material, melting at 186–187° C. A yield of 62 percent was obtained.

Example 27

24 grams of purified commercial grade trioxane were added to 300 grams of Vaseline oil having a viscosity of 98 centipoises at 20° C. The trioxane-vaseline system was kept at 63° C., in a thermostated bath and thoroughly agitated. While continuing the agitation, 0.015 milliliter of boron trifluoride etherate suspended in 20 grams of Vaseline oil were added to the homogeneous trioxane solution.

Agitation was stopped following the addition of the catalyst suspension and the reaction medium, after having been maintained for 20 minutes at the initial temperature, was cooled at a controlled rate of 15° C. per hour. When room temperature was reached, the reaction mixture was filtered. Only a very small amount of a powdery polymeric material melting at 178–180° C. was obtained.

Example 28

28 grams of commercial grade trioxane previously purified in the manner hereinbefore specified were mixed with 300 grams of Vaseline oil having a viscosity of 120 centipoises at 20° C. The mixture was kept at 64° C. in a thermostatic vessel under agitation. To the solution, 0.008 milliliter of boron trifluoride etherate dispersed in 20 grams of Vaseline oil was added while continuing agitation. After all the catalyst had been added, agitation of the mixture was stopped and the mixture was allowed to stand at the initial temperature for 60 minutes. Successively, it was allowed to cool at the rate of 28° C. per hour. After room temperature was reached, the reaction product was filtered and a fiberlike polymeric material, melting at 186–187° C. was recovered. Yields were of 55 percent.

The foregoing description of the invention and the examples of the practice thereof are illustrative of various embodiments of the invention and the effects of alteration of various process parameters. The details of the examples and description, however, are not intended to be limiting, but are included merely for illustrative purposes. Thus, in so far as innovations and modifications are utilized by those skilled in the art in practicing a polyoxymethylene polymerization process which continues to reply upon the principles underlying the present invention, such modifications and innovations are deemed to fall within the scope of the invention except as the same is necessarily limited by the language of the appended claims or reasonable equivalents thereof.

We claim:

1. A process for preparing solid high molecular weight polyoxymethylene of high crystallinity which comprises contacting at an initial temperature of at least the melting point of trioxane a catalytic amount of an ionic trioxane polymerization catalyst with a solution of trioxane in a viscous, nonaqueous inert solvent having a positive thermal coefficient of solution for trioxane, maintaining the solution at at least the melting point of trioxane until polymerization commences and thereafter gradually decreasing the temperature of said solution to below the melting point of trioxane at a controlled rate of decrease of from about 4° C. per hour to about 50° C. per hour until trioxane crystallizes from solution and is polymerized.

2. A process for preparing solid, high molecular weight polyoxymethylene of high crystallinity in the form of fibers which comprises contacting at an initial temperature of at least the melting point of trioxane, a catalytic amount of an ionic, trioxane-polymerization catalyst with a mixture of trioxane dissolved for its major part in a viscous, nonaqueous inert solvent having a positive thermal coefficient of solution for trioxane; and gradually decreasing the temperature of said solution during said contact from said initial temperature at a controlled rate of decrease of from about 4° C. per hour to about 50° C. per hour until trioxane crystallizes from solution and is polymerized.

3. The process claimed in claim 2 wherein polymerization is carried out in the absence of agitation.

4. The process claimed in claim 3 wherein the temperature of said mixture is decreased at a substantially constant rate.

5. The process claimed in claim 4 wherein said viscous, nonaqueous solvent has a viscosity at 20° C. of from about 20 centipoises to about 1000 centipoises.

6. The process claimed in claim 5 wherein the viscous, nonaqueous solvent utilized is a petroleum jelly, semisolid mixture of hydrocarbons having a specific gravity at 60° C. of from about 0.815 to about 0.890, a melting point range of from about −40° C. to about 60° C. and a viscosity at 20° C. of from about 90 centipoises to about 200 centipoises.

7. The process claimed in claim 5 wherein said viscous, nonaqueous solvent is a hydrocarbon material.

8. The process claimed in claim 5 wherein said viscous, nonaqueous solvent has a viscosity at 20° C. of from about 50 centipoises to about 400 centipoises.

9. The process claimed in claim 4 wherein said catalytic amount of trioxane-polymerization catalyst comprises from about 0.0005 percent by weight to about 1.0 percent by weight, based on the weight of the trioxane used.

10. The process as claimed in claim 9 wherein said catalytic amount of catalyst comprises from about 0.001 percent by weight to about 0.02 percent by weight, based on the weight of the trioxane in solution.

11. The process as claimed in claim 4 wherein said trioxane-polymerization catalyst is selected from the group consisting of fluosulfonic acid, thionyl chloride, the halides of boron, aluminum, zinc, zirconium, tin antimony, bismuth nickel titanium, manganese, iron, chromium, vanadium, mercury, silver, ammonium and phosphorus, mixtures of said metal halides, complexes of said metal halides with alcohols, phenols, esters, ethers, ketones, aldehydes, organic acids, mercaptans, dialkyl sulfides and organic acid anhydrides and boron fluoride coordinate complexes with water.

12. The process claimed in claim 11 wherein said trioxane-polymerization catalyst is boron trifluoride etherate.

13. The process as claimed in claim 4 wherein contact between said catalyst and the trioxane solution is established by suspending the catalyst in particulate form in said solution.

14. The process claimed in claim 4 wherein contact between said catalyst and the trioxane solution is established by dissolving the catalyst in said solution.

15. The process claimed in claim 4 wherein the trioxane, solvent and catalyst are initially contacted at a temperature of between the melting point of trioxane and 70° C.

16. The process claimed in claim 4 wherein an initial temperature of between 61° C. and 70° C. is employed and said trioxane mixture is a saturated solution at the initial temperature containing small amounts of undissolved trioxane.

17. The process claimed in claim 6 wherein an initial temperature of between the melting point of trioxane and 62° C. is employed and about more than 12 percent by weight trioxane is dissolved in the petroleum jelly.

18. The process claimed in claim 4 wherein the temperature of the polymerization reaction mixture is decreased until a temperature of about 20° C. is attained.

19. The process claimed in claim 4 wherein contact between the catalyst and the trioxane solution is established by passing the catalyst through the solution in gaseous form.

20. The process for continuously preparing solid, high molecular weight, polyoxymethylene of high crystallinity in the form of fibers which comprises:
  (a) continuously mixing at a temperature of between the melting point of trioxane and 70° C.
    (i) a substantially saturated solution of trioxane containing small quantities of molten trioxane in suspension in a viscous, non-aqueous inert solvent having a positive thermal coefficient of solution for trioxane, and
    (ii) a catalytic amount of an ionic trioxane-polymerization catalyst;
  (b) continuously passing the mixture in laminar flow through an elongated reaction zone while gradually decreasing the temperature thereof at a substantially constant rate of between about 4° C. per hour and about 20° C. per hour until trioxane crystallizes from solution and is polymerized; then
  (c) removing the polymerized trioxane from the cooler end of said reaction zone.

References Cited by the Examiner

UNITED STATES PATENTS

| | | | |
|---|---|---|---|
| 2,768,994 | 10/1956 | MacDonald | 260—67 |
| 2,775,570 | 12/1956 | Barkdoll et al. | 260—33.4 |
| 2,791,000 | 5/1957 | Bechtold | 260—33.6 |
| 2,844,561 | 7/1958 | Bechtold et al. | 260—67 |
| 2,989,505 | 6/1961 | Hudgin et al. | 260—67 |
| 2,989,510 | 6/1961 | Bruni | 260—67 |
| 2,989,511 | 6/1961 | Schnizer | 260—67 |
| 3,087,911 | 4/1963 | Ainsworth | 260—67 |
| 3,144,433 | 8/1964 | Hopff et al. | 260—67 |

WILLIAM H. SHORT, *Primary Examiner.*

L. M. MILLER, *Assistant Examiner.*